(12) United States Patent
Joshi et al.

(10) Patent No.: US 11,999,152 B2
(45) Date of Patent: Jun. 4, 2024

(54) PASSIVE THERMAL MANAGEMENT USING THERMORESPONSIVE HYDROGEL

(71) Applicants: Toyota Motor Engineering & Manufacturing North America, Inc, Plano, TX (US); The Board of Trustees of the University of Illinois, Urbana, IL (US)

(72) Inventors: Shailesh N. Joshi, Ann Arbor, MI (US); Dajie Xie, Champaign, IL (US); Paul Braun, Champaign, IL (US)

(73) Assignees: Toyota Motor Engineering & Manufacturing North America, Inc., Plano, TX (US); The Board of Trustees of the University of Illinois, Urbana, IL (US)

( * ) Notice: Subject to any disclaimer, the term of this patent is extended or adjusted under 35 U.S.C. 154(b) by 144 days.

(21) Appl. No.: 17/554,177

(22) Filed: Dec. 17, 2021

(65) Prior Publication Data
US 2023/0191743 A1    Jun. 22, 2023

(51) Int. Cl.
*B32B 5/18*      (2006.01)
*B32B 5/32*      (2006.01)
*B32B 37/14*     (2006.01)

(52) U.S. Cl.
CPC .................. *B32B 5/18* (2013.01); *B32B 5/32* (2013.01); *B32B 37/14* (2013.01); *B32B 2264/108* (2013.01); *B32B 2266/0257* (2013.01); *B32B 2266/122* (2016.11); *B32B 2305/026* (2013.01); *B32B 2307/30* (2013.01); *B32B 2307/412* (2013.01)

(58) Field of Classification Search
CPC ...... B32B 2264/108; B32B 2266/0257; B32B 2266/122; B32B 2305/026; B32B 2307/30; B32B 2307/412; B32B 37/14; B32B 5/18; B32B 5/32
See application file for complete search history.

(56) References Cited

U.S. PATENT DOCUMENTS

| | | | |
|---|---|---|---|
| 2016/0220951 A1* | 8/2016 | Reinders | B01D 53/28 |
| 2023/0243555 A1* | 8/2023 | Joshi | F24S 80/52 |
| | | | 126/569 |

FOREIGN PATENT DOCUMENTS

| | | |
|---|---|---|
| CN | 109971001 A | 7/2019 |
| CN | 107051341 B | 3/2020 |
| CN | 111154027 A | 5/2020 |
| CN | 109134887 B | 6/2020 |
| CN | 111494701 A | 8/2020 |

* cited by examiner

*Primary Examiner* — Hai Vo
(74) *Attorney, Agent, or Firm* — Jordan IP Law, LLC

(57) ABSTRACT

A passive thermal management system and methods of using a thermoresponsive hydrogel coating configured to autonomously switch between a heating state and a cooling state based on ambient temperature. At temperature greater than a lower critical solution temperature of the thermoresponsive hydrogel, the thermoresponsive hydrogel coating becomes solar reflective and has enhanced radiative cooling ability to achieve daytime radiative cooling. At temperatures less than the lower critical solution temperature, the thermoresponsive hydrogel coating becomes transparent to facilitate absorption of solar radiation by sun absorber.

3 Claims, 6 Drawing Sheets

PASSIVE THERMAL MANAGEMENT USING THERMORESPONSIVE HYDROGEL

TECHNICAL FIELD

Embodiments relate generally to a passive thermal management system and methods of using a thermoresponsive hydrogel coating configured to autonomously switch between a heating state and a cooling state based on ambient temperature. At temperature greater than a lower critical solution temperature of the thermoresponsive hydrogel, the thermoresponsive hydrogel coating becomes solar reflective and has radiative cooling ability to achieve daytime radiative cooling. At temperatures less than the lower critical solution temperature, the thermoresponsive hydrogel coating becomes transparent to facilitate absorption of solar radiation by sun absorber.

BACKGROUND

Radiative cooling is a process involving the loss of heat by a body through thermal radiation. Passive radiative cooling relies on the high transparency of earth's atmosphere in mid-infrared (MIR) wavelengths to cool terrestrial objects by radiating heat to the cold outer space. Realizing passive radiative cooling below ambient temperatures during the daytime requires ultrahigh solar reflectivity to minimize the absorption of solar radiation. Solar radiation, however, is one potential source of passive heating. Most contemporary daytime radiative cooling systems have exceptional passive cooling performance in hot weather, but lack the capability of changing solar reflectivity to control the solar heating and are incapable of switching from the cooling state to a heating state to meet the needs in cold weather.

Some passive radiative cooling solutions incorporate a hydrogel comprising pure Poly(N-isopropylacrylamide) (PNIPAM) polymer. PNIPAM undergoes reversible phase separation due to lower critical solution temperature (LCST). Below LCST, PNIPAM becomes hydrated through hydrogen bonding with water and is optically transparent. Above LCST, PNIPAM hydrogel becomes white since it undergoes phase separation and scatters the incident light. At the same time, PNIPAM hydrogel presents ultrahigh MIR emissivity, making it suitable for efficient radiative cooling. Consequently, PNIPAM hydrogel system shows great potential to realize the passive thermal management. The LCST of a pure Poly(N-isopropylacrylamide) (PNIPAM) hydrogel polymer is around 32° C. Such a hydrogel can only be switched to a white state for self-cooling when the temperature is at or above 32° C.

BRIEF SUMMARY

Embodiments relate to a passive thermal management system configured to autonomously switch between a heating state and a cooling state based on ambient temperature. The passive thermal management system comprises a switchable coating comprising a polymer hydrogel formed on and/or over a sun absorber. At temperatures that are greater than the LCST of the polymer hydrogel, the switchable coating becomes solar reflective and has radiative cooling ability to achieve daytime radiative cooling. At temperatures that are less than the LCST, the switchable coating becomes transparent and solar radiation is absorbed by sun absorber to achieve heating. Such heating can be achieved by virtue of the fact solar radiation power exceeds radiative cooling power.

In accordance with one or more embodiments, a thermal management system comprises one or more of the following: a substrate; and a thermally responsive multilayer structure on the substrate. The thermally responsive multilayer structure comprises an inner porous layer formed on the substrate, and an outer composite layer formed on the inner porous layer, the outer composite layer being composed of a thermally switchable sublayer and a optically absorptive sublayer formed, the thermally switchable sublayer configured to autonomously transition between a heating absorbing state and a heat dissipation state in response to a change in ambient temperature, the optically absorptive sublayer configured to absorb solar radiation.

In accordance with one or more embodiments, a thermally responsive multilayer structure comprises one or more of the following: an inner porous layer formed on a substrate, and an outer composite layer formed on the inner porous layer, the outer composite layer being composed of a thermally switchable sublayer and a optically absorptive sublayer formed, the thermally switchable sublayer configured to autonomously transition between a heating absorbing state and a heat dissipation state in response to a change in ambient temperature, the optically absorptive sublayer configured to absorb solar radiation.

In accordance with one or more embodiments, a method of producing a thermally responsive multilayer structure for a thermal management system comprises one or more of the following: forming an inner porous layer on a substrate; and forming an outer composite layer on the inner porous layer, the outer composite layer comprising a first sublayer and a second sublayer, the first sublayer being composed of a thermally switchable material configured to autonomously transition between a heating absorbing state and a heat dissipation state in response to a change in ambient temperature, the second sublayer being composed of an optically absorptive material configured to absorb solar radiation.

In accordance with one or more embodiments, a method of producing a thermally responsive multilayer structure for a thermal management system comprises one or more of the following: forming an inner porous layer on a substrate; altering the lower critical solution temperature (LCST) of a thermochromic PNIPAM hydrogel; forming an outer composite layer on the inner porous layer, the outer composite layer comprising a first sublayer and a second sublayer, the first sublayer being composed of the thermochromic PNIPAM hydrogel configured to autonomously transition between a heating absorbing state and a heat dissipation state in response to a change in ambient temperature, the second sublayer being composed of an optically absorptive material configured to absorb solar radiation.

In accordance with one or more embodiments, a method of producing a thermally responsive multilayer structure for a thermal management system comprises one or more of the following: forming an inner porous layer on a substrate; increasing the visible/near infrared reflectivity of a thermochromic PNIPAM hydrogel; forming an outer composite layer on the inner porous layer, the outer composite layer comprising a first sublayer and a second sublayer, the first sublayer being composed of the thermochromic PNIPAM hydrogel configured to autonomously transition between a heating absorbing state and a heat dissipation state in response to a change in ambient temperature, the second sublayer being composed of an optically absorptive material configured to absorb solar radiation.

In accordance with one or more embodiments, a method of producing a thermally responsive multilayer structure for a thermal management system comprises one or more of the following: forming an inner porous layer on a substrate; increasing the porosity of a thermochromic PNIPAM hydrogel; and forming an outer composite layer on the inner porous layer, the outer composite layer comprising a first sublayer and a second sublayer, the first sublayer being composed of the thermochromic PNIPAM hydrogel configured to autonomously transition between a heating absorbing state and a heat dissipation state in response to a change in ambient temperature, the second sublayer being composed of an optically absorptive material configured to absorb solar radiation.

In accordance with one or more embodiments, a method of producing a thermally responsive multilayer structure for a thermal management system comprises one or more of the following: forming, as a water reservoir, an inner porous layer on a substrate; and forming an outer composite layer on the inner porous layer, the outer composite layer being composed of a thermally switchable sublayer and an optically absorptive sublayer configured to absorb solar radiation, wherein, in response to a change in ambient temperature, the thermally switchable sublayer is configured to autonomously transition between a heating absorbing state in which the thermally switchable sublayer absorbs water from the water reservoir, and a heat dissipation state in which the thermally switchable sublayer releases water to be absorbed by the water reservoir.

In accordance with one or more embodiments, a method of producing a thermally responsive multilayer structure for a thermal management system comprises one or more of the following: forming, as a water reservoir, an inner porous layer on a substrate; altering the lower critical solution temperature (LCST) of a thermochromic PNIPAM hydrogel; and forming an outer composite layer on the inner porous layer, the outer composite layer being composed of the thermochromic PNIPAM hydrogel sublayer and an optically absorptive sublayer configured to absorb solar radiation, wherein, in response to a change in ambient temperature, the thermochromic PNIPAM hydrogel sublayer is configured to autonomously transition between a heating absorbing state in which the thermochromic PNIPAM hydrogel sublayer absorbs water from the water reservoir, and a heat dissipation state in which the thermochromic PNIPAM hydrogel sublayer releases water to be absorbed by the water reservoir.

In accordance with one or more embodiments, a method of producing a thermally responsive multilayer structure for a thermal management system comprises one or more of the following: forming, as a water reservoir, an inner porous layer on a substrate; increasing the visible/near infrared reflectivity of a thermochromic PNIPAM hydrogel; and forming an outer composite layer on the inner porous layer, the outer composite layer being composed of the thermochromic PNIPAM hydrogel sublayer and an optically absorptive sublayer configured to absorb solar radiation, wherein, in response to a change in ambient temperature, the thermochromic PNIPAM hydrogel sublayer is configured to autonomously transition between a heating absorbing state in which the thermochromic PNIPAM hydrogel sublayer absorbs water from the water reservoir, and a heat dissipation state in which the thermochromic PNIPAM hydrogel sublayer releases water to be absorbed by the water reservoir.

In accordance with one or more embodiments, a method of producing a thermally responsive multilayer structure for a thermal management system comprises one or more of the following: forming, as a water reservoir, an inner porous layer on a substrate; increasing the porosity of a thermochromic PNIPAM hydrogel; and forming an outer composite layer on the inner porous layer, the outer composite layer being composed of the thermochromic PNIPAM hydrogel sublayer and an optically absorptive sublayer configured to absorb solar radiation, wherein, in response to a change in ambient temperature, the thermochromic PNIPAM hydrogel sublayer is configured to autonomously transition between a heating absorbing state in which the thermochromic PNIPAM hydrogel sublayer absorbs water from the water reservoir, and a heat dissipation state in which the thermochromic PNIPAM hydrogel sublayer releases water to be absorbed by the water reservoir.

BRIEF DESCRIPTION OF THE SEVERAL VIEWS OF THE DRAWINGS

The various advantages of the one or more embodiments will become apparent to one skilled in the art by reading the following specification and appended claims, and by referencing the following drawings, in which:

DETAILED DESCRIPTION

Figure 1:
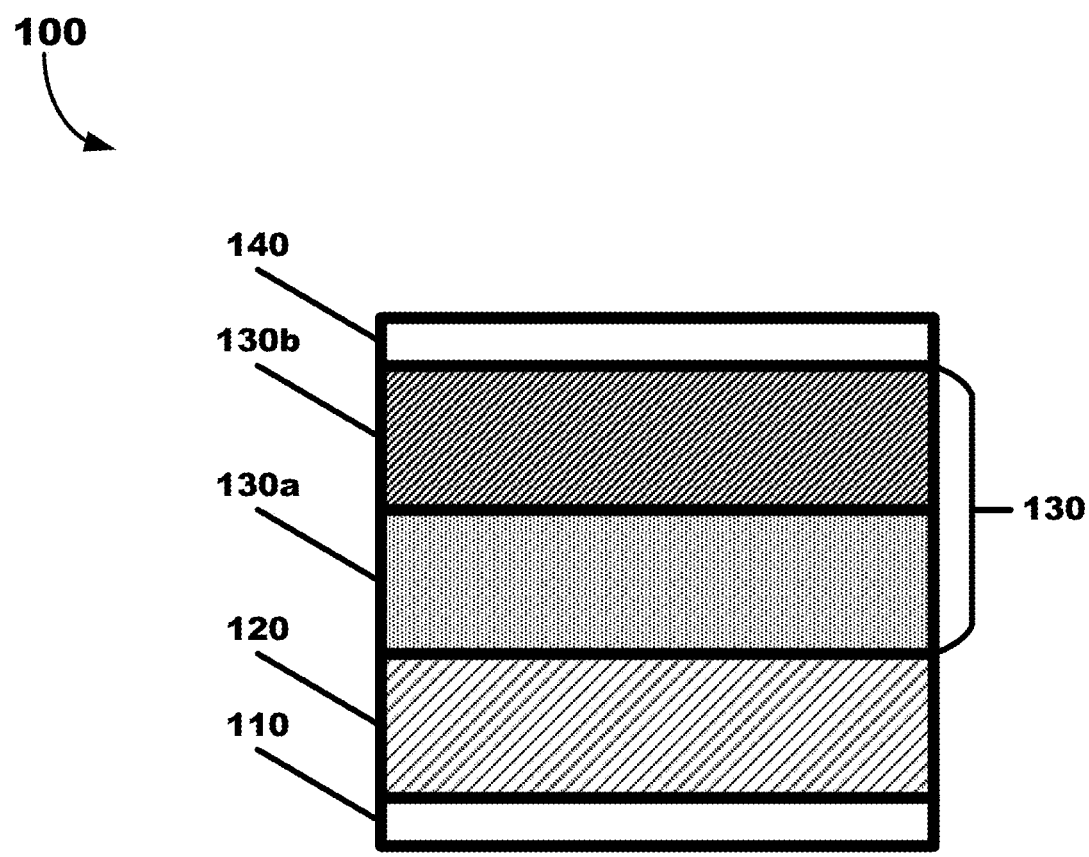
FIG. 1 illustrates a cross-section of a passive thermal management system, in accordance with one or more embodiments set forth, shown, and described herein.

FIG. 1 illustrates an example passive thermal management system 100 in accordance with one or more embodiments set forth, described, and/or illustrated herein. The example passive thermal management system 100 should have operational characteristics such that at low temperatures, it exhibits low visual/near infrared (Vis/NIR) reflectivity (i.e., high Vis/NIR absorptivity) to maximize solar heat and lower mid-infrared (MIR) emissivity. Whereas, at high temperatures, the passive thermal management system 100 exhibits high Vis/NIR reflectivity to minimize solar heat and high MIR emissivity.

The illustrated example passive thermal management system 100 may have mobility applications such as, for example, as a thermoresponsive surface in an electric vehicle (EV), to include airborne electric vehicles, seaborne electric vehicles, electrically-powered spacecraft, and ground vehicles (e.g., hybrid electric vehicles (HEV), plug-in hybrid electric vehicles (PHEV), battery electric vehicles (BEV), fuel cell electric vehicles (FCEV), and railborne electric vehicles (REV)). Although the example passive thermal management system 100 may be implemented for such mobility applications, embodiments are not limited thereto, and thus, this disclosure contemplates that the passive thermal management system 100 may be implemented as a thermoresponsive surface in non-mobility or stationary applications.

The example passive thermal management system 100 comprises a substrate 110, and a thermally responsive multilayer structure formed on and/or over the substrate 110. In the illustrated example embodiment, the thermally responsive multilayer structure comprises an inner porous layer 110 formed on and/or over the substrate 100, and an outer composite layer 130 formed on and/or over the inner porous layer 110. The outer composite layer 130 comprises an optically absorptive sublayer 130a and a thermally switchable sublayer 130b. The optically absorptive sublayer 130a is configured to absorb solar radiation, whereas the thermally switchable sublayer 130b is configured to autonomously transition between a heating absorbing state and a heat dissipation state in response to a change in ambient temperature. One or more encapsulating layers 140 are formed on and/or over the multilayer structure to serve as a hermetic seal which prevents the evaporation of water from the example passive thermal management system 100.

In operation of the example passive thermal management system 100, the inner porous layer 110 is configured to serve as a water reservoir.

Figure 2:
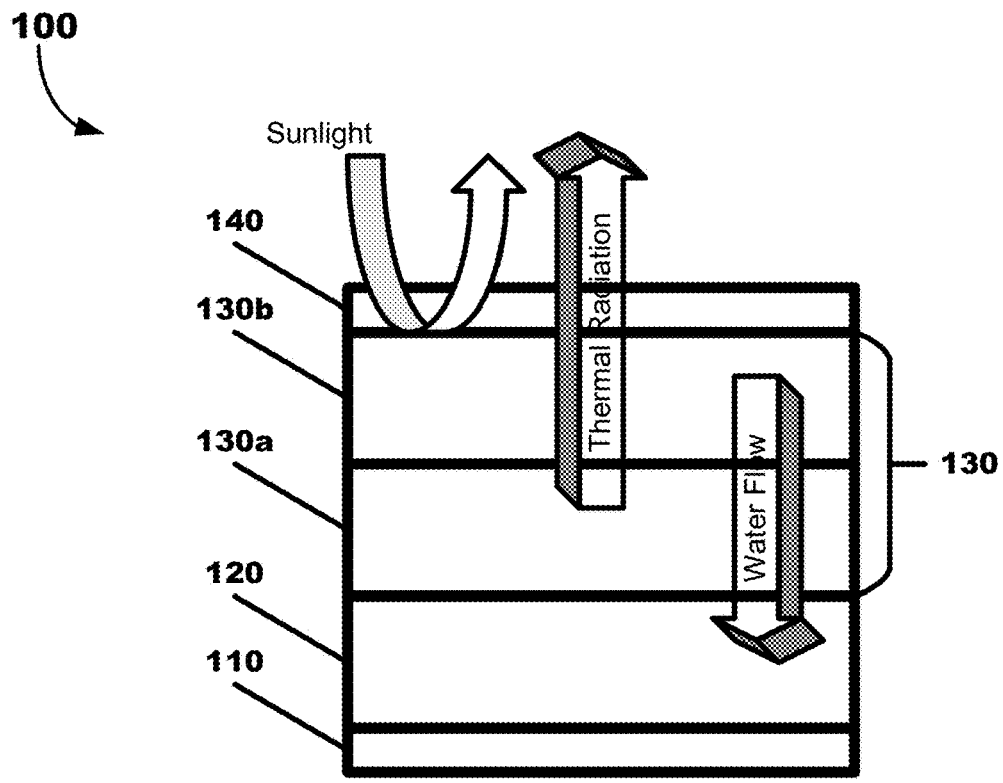
FIG. 2 illustrates a cross-section of the passive thermal management system of FIG. 1, in a heat dissipation state.

As illustrated in FIG. 2, at temperatures greater than the lower critical solution temperature (LCST) of the thermally switchable sublayer 130b, the thermally switchable sublayer 130a autonomously transitions from a soluble hydrated state to an insoluble dehydrated state to release water to be absorbed by the inner porous layer 110. Meaning, at temperatures above the LCST, the thermally switchable sublayer 130b becomes solar reflective and has strong radiative cooling ability to achieve daytime radiative cooling.

Figure 3:
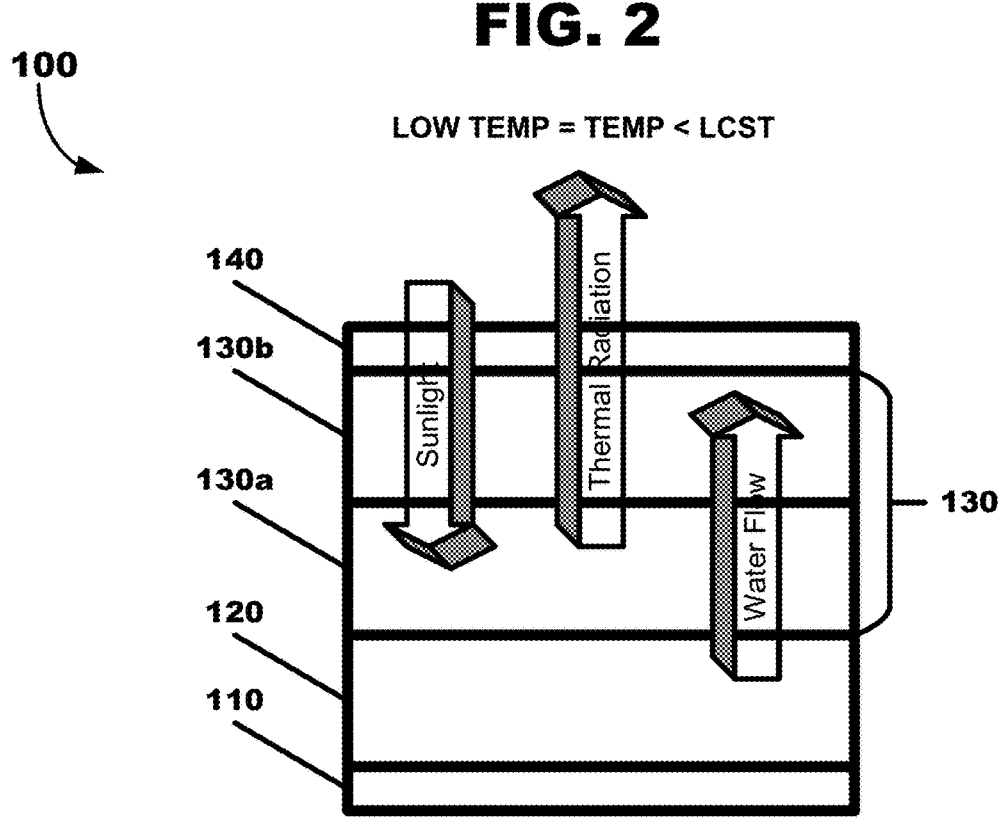
FIG. 3 illustrates a cross-section of the passive thermal management system of FIG. 1, in a heat absorbing state.

As illustrated in FIG. 3, at a temperature less than the LCST of the thermally switchable sublayer 130b, the thermally switchable sublayer 130b autonomously transitions from the insoluble dehydrated state to the soluble hydrated state to absorb water from the inner porous layer 110. Meaning, at temperatures below the LCST, the thermally switchable sublayer 130b becomes transparent to permit absorption of solar radiation by the optically absorptive sublayer 130a.

In accordance with one or more example embodiments, the thermally switchable sublayer 130b comprises a thermally responsive polymer hydrogel, such as a thermochromic Poly(N-isopropylacrylamide) (PNIPAM) hydrogel. Thermochromic PNIPAM hydrogels have reversible volume phase transition at LCST of 32° C. that changes its visible (Vi)/near infrared (NIR) reflectivity. Thermochromic PNIPAM hydrogels also exhibit strong infrared emissivity (around 95%) for efficient radiative cooling. Embodiments, however, are not limited thereto, and thus, this disclosure contemplates the thermally switchable sublayer 130b comprising any suitable material that falls within the spirit and scope of the principles of this disclosure.

In accordance with one or more example embodiments, the optically absorptive sublayer 130a comprises a carbon-based material, such as graphite. Embodiments, however, are not limited thereto, and thus, this disclosure contemplates the optically absorptive sublayer 130a comprising any suitable material that falls within the spirit and scope of the principles of this disclosure.

In accordance with one or more example embodiments, the one or more encapsulating layers 140 comprises an optically transparent material, such as polyethylene (PE). Embodiments, however, are not limited thereto, and thus, this disclosure contemplates the one or more encapsulating layers 140 comprising any suitable material that falls within the spirit and scope of the principles of this disclosure.

The original LCST of pure thermochromic PNIPAM is around 32° C., meaning below 32° C. the passive thermal management system 100 is absorptive and must be heated to a higher temperature until reaching its maximum reflectivity in order to switch to a cooling state. The final equilibrium temperature of the system will be above the LCST and the original LCST is too high for the passive thermal management system 100 to create a comfortable environment. Should the reflectivity of the passive thermal management system 100 reach its maximum and initiates cooling at a lower temperature, the final equilibrium temperature will also be lower.

Accordingly, in accordance with one or more example embodiments, the LCST of the thermochromic PNIPAM hydrogel may be selectively altered (e.g., reduced) in order to facilitate autonomous switching of the example passive thermal management system 100 between a heating state and a cooling state at a designed temperature instead of its original LCST. Embodiments facilitate the decrease of the final equilibrium temperature of the passive thermal management system 100 by decreasing the LCST via selective control over salt concentration, solvents, copolymerization, etc. of the thermochromic PNIPAM hydrogel.

Figure 4:
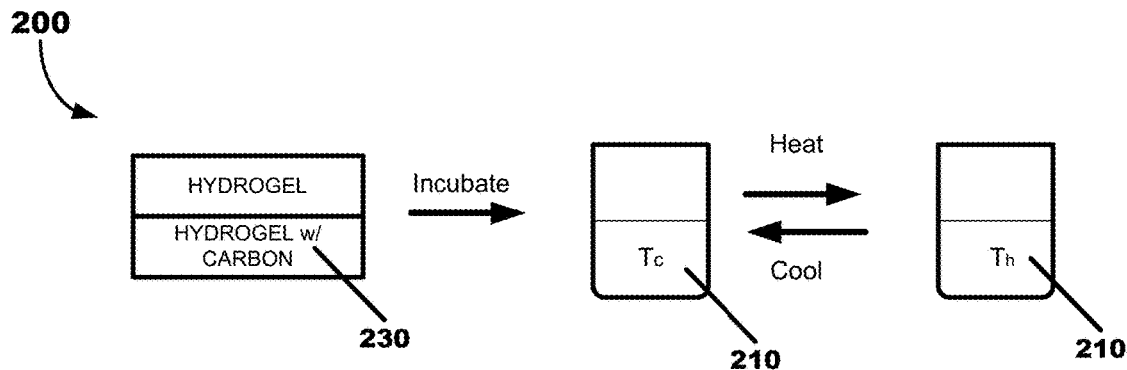
FIG. 4 illustrates a method of altering the lower critical solution temperature (LCST) of a thermochromic PNIPAM hydrogel, in accordance with one or more embodiments set forth, shown, and described herein.
Figure 6:
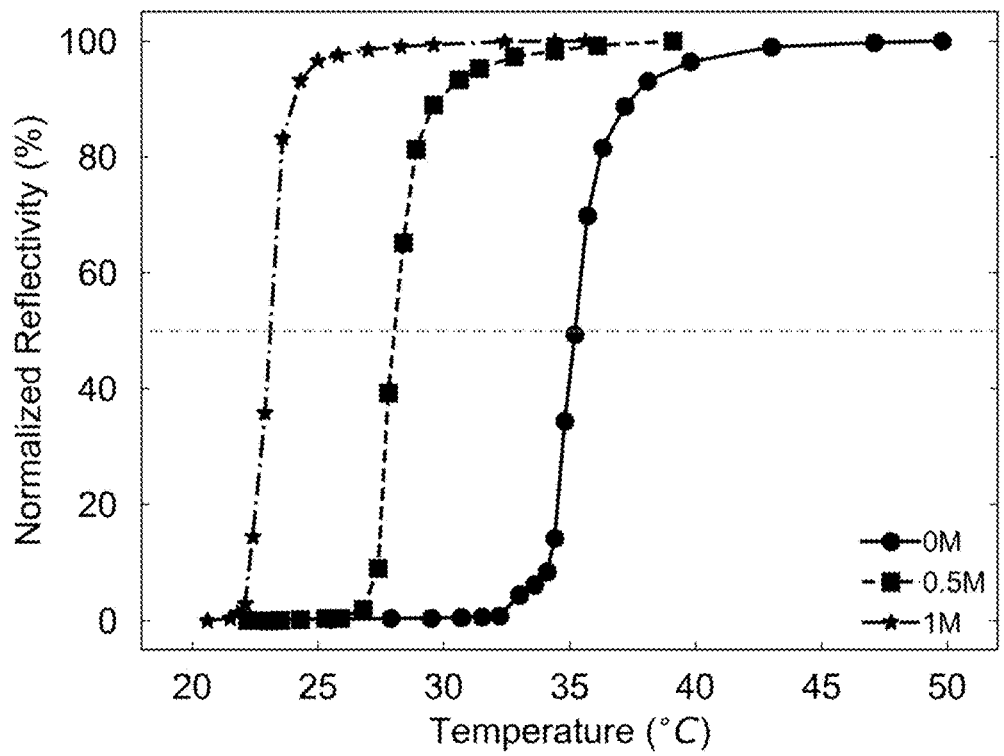
FIG. 6 illustrates a graph showing normalized reflectivity versus temperature of a pure thermochromic PNIPAM hydrogel and thermochromic PNIPAM hydrogels having increased salt concentration, in accordance with one or more embodiments set forth, shown, and described herein.

Alteration of the LCST may be achieved, as indicated in the illustrated embodiment of FIG. 4, via a method 200 that adds ions to the thermochromic PNIPAM hydrogel by salted solvent exchange since ions can disrupt the hydration structure between the polymer chains and water molecules. In the method 200, a composite hydrogel 230 comprising an optically absorptive sublayer and a thermally switchable sublayer is incubated in a salted aqueous solution 210 until reaching a predetermined temperature $T_c$ (e.g., 25° C.). The salted aqueous solution 210 containing the composite hydrogel 230 is then heated to reach a predetermined temperature to $T_h$ (e.g., 50° C.) and then maintained at $T_h$ for a predetermined time period (e.g., 30 min). The salted aqueous solution 210 containing the composite hydrogel 230 is then cooled down to $T_c$ for a predetermined time period (e.g., 30 min). The heating/cooling cycle is repeated a plurality of times (e.g., three times) to ensure the solvent exchange for the composite hydrogel 230. As illustrated in FIG. 6, the LCST of the thermochromic PNIPAM hydrogel film is defined when the transmissivity reaches 50%, and the LCST decreases to 23° C. when the NaCl concentration increases to 1M.

At a cooling state, a thermochromic PNIPAM hydrogel has a visible reflectivity of around 80% and an overall average reflectivity of around 65%. To achieve enhanced daytime radiative cooling performance, a greater Vis-NIR reflectivity at the cooling state is required in order to the minimize the absorption of incoming solar radiation. In accordance with one or more example embodiments, the Vis-NIR reflectivity of a thermochromic PNIPAM hydrogel may be selectively increased/enhanced to yield enhanced cooling performance at a cooling state.

Figure 5:
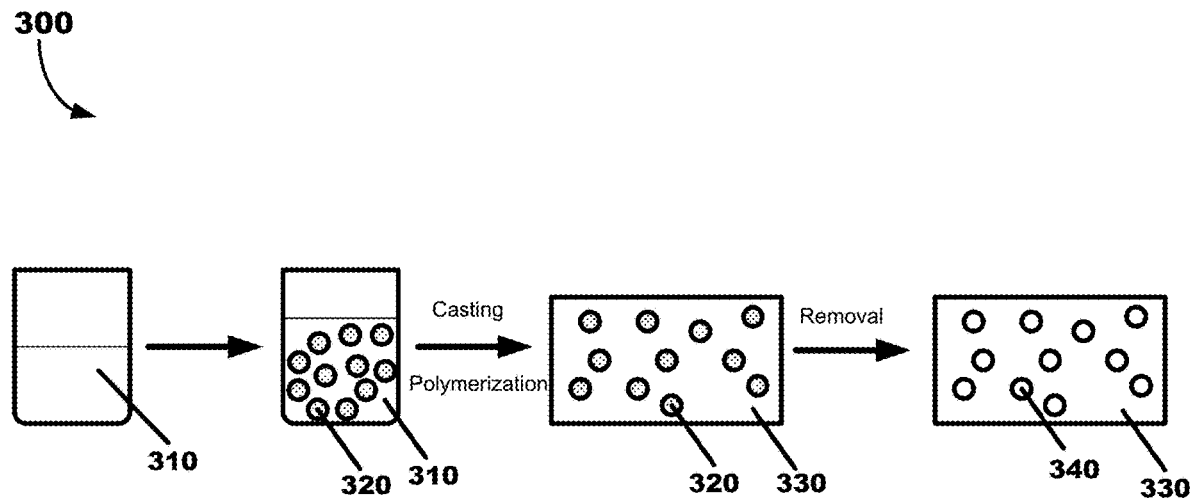
FIG. 5 illustrates a method of increasing the porosity of a thermochromic PNIPAM hydrogel, in accordance with one or more embodiments set forth, shown, and described herein.
Figure 7:
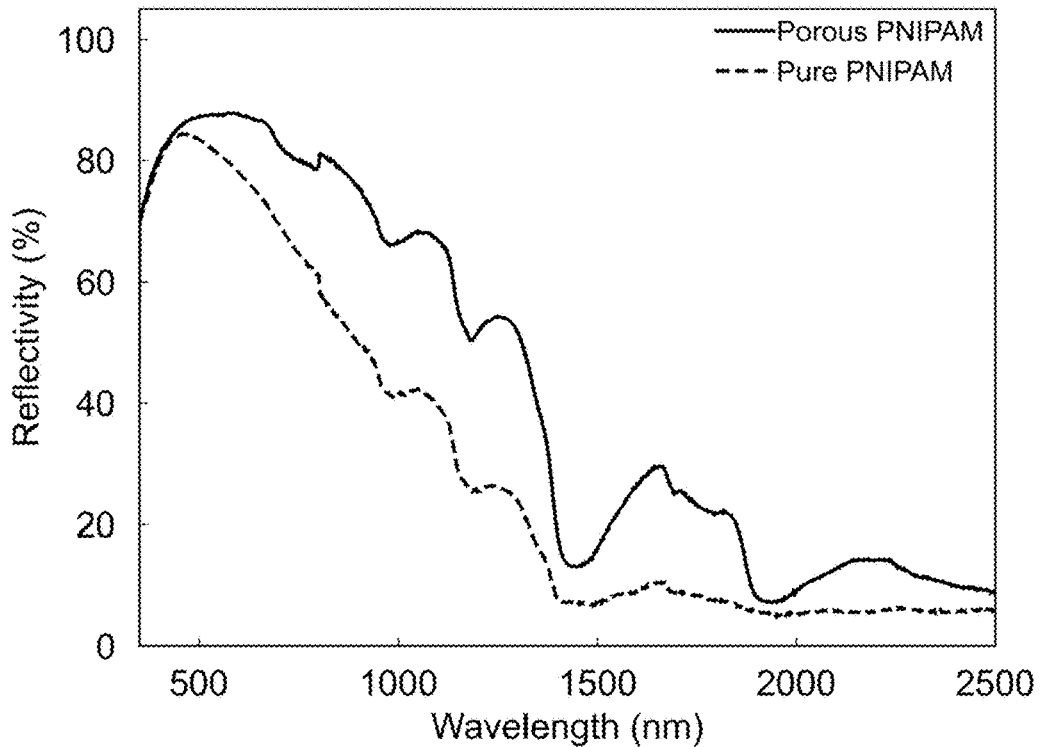
FIG. 7 illustrates a graph showing reflectivity versus wavelength of a pure thermochromic PNIPAM hydrogel and a thermochromic PNIPAM hydrogel having increased porosity, in accordance with one or more embodiments set forth, shown, and described herein.

Increasing/enhancing the Vis-NIR reflectivity of the thermochromic PNIPAM hydrogel may be achieved, as indicated in the illustrated embodiment of FIG. 5, via a method 300 that selectively increases the porosity of the composite hydrogel 330 or selectively adds high index inorganic particles to the composite hydrogel 330. In the method 300, the porosity of the thermochromic PNIPAM hydrogel is selectively increased through the addition of one or more sacrificial materials/structures 320 having a predetermined size (e.g., around 1-5 um) to a precursor PNIPAM hydrogel solution 310. In accordance with the method 300, the one or more sacrifice materials/structures 320 comprises one or more of $SiO_2$/Polystyrene (PS) spheres, emulsified oil droplets, etc. and combinations thereof. After polymerization precursor PNIPAM hydrogel solution 310 that includes the one or more sacrificial materials 320, the one or more sacrificial materials 320 are removed using one or more solvents. As illustrated in the graph of FIG. 7, results reveal that the overall reflectivity of a porous thermochromic PNIPAM hydrogel at high temperature is greater than that of a pure thermochromic PNIPAM hydrogel.

FIGS. 8 through 11 respectively illustrates a method 800 through 1100 of operating a power generation system. Each method 800 through 1100 may be implemented manually or alternatively, via one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

In one or more examples, software executed by one or processors of a computing device may be configured to perform one or more processing blocks of the methods 800 through 1100 set forth, described, and/or illustrated herein, or provides functionality set forth, described, and/or illustrated.

Figure 8:
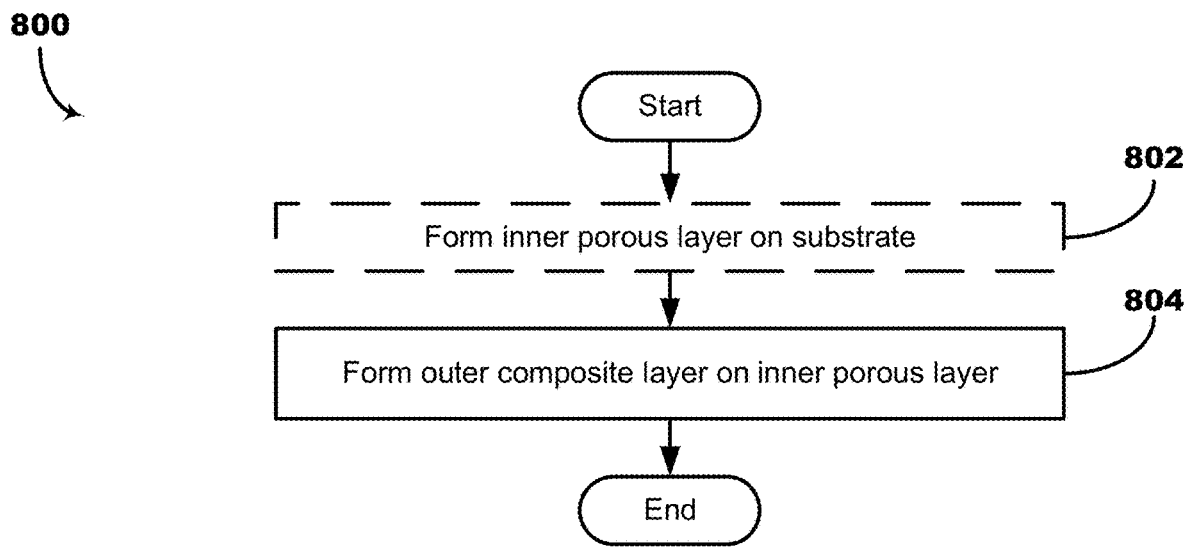
FIGS. 8 through 11 respectively illustrate a flowchart of a method of producing a thermally responsive multilayer structure for a thermal management system, in accordance with one or more embodiments set forth, shown, and described herein.

In the illustrated example of FIG. 8, the method 800 includes illustrated block 802, which includes forming (e.g., by deposition) an inner porous layer on a substrate. In accordance with the method 800, the inner porous layer is configured to serve as a water reservoir.

The method 800 may then proceed to illustrated process block 804, which includes forming an outer composite layer on the inner porous layer.

In accordance with the method 800, the outer composite layer comprises a first sublayer composed of a thermally switchable material and a second sublayer composed of an optically absorptive material. The thermally switchable material is configured to autonomously transition between a heating absorbing state and a heat dissipation state in response to a change in ambient temperature. The optically absorptive material is configured to absorb solar radiation. The thermally switchable material comprises a thermally responsive polymer hydrogel, such as, for example, a thermochromic PNIPAM hydrogel. The optically absorptive material comprises a carbon-based material, such as, for example, graphite.

In accordance with the method 800, at a temperature less than the LCST of the thermally switchable sublayer, the thermally switchable sublayer absorbs water from the water reservoir. At a temperature greater than the LCST of the thermally switchable sublayer, the thermally switchable sublayer releases water to be absorbed by the water reservoir.

The method 800 may terminate or end after execution of process block 804.

Figure 9:
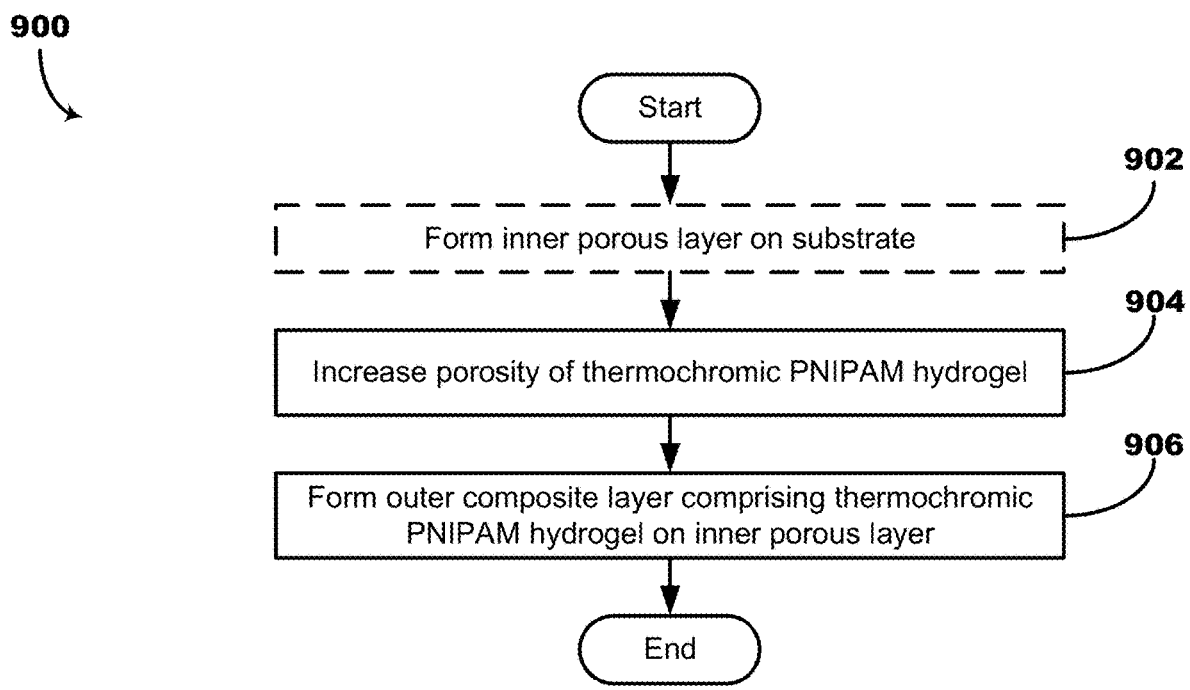

In the illustrated example of FIG. 9, the method 900 includes illustrated block 902, which includes forming (e.g., by deposition) an inner porous layer on a substrate. In accordance with the method 900, the inner porous layer is configured to serve as a water reservoir.

The method 900 may then proceed to illustrated process block 904, which includes increasing the porosity of a thermochromic PNIPAM hydrogel.

In accordance with the method 900, increasing the porosity of the thermochromic PNIPAM hydrogel comprises: adding one or more sacrifice materials having a predetermined size (of approximately 1-5 um) to a precursor thermochromic PNIPAM hydrogel solution; polymerizing the precursor thermochromic PNIPAM hydrogel solution; and removing the one or more sacrifice materials from the polymerized precursor thermochromic PNIPAM hydrogel solution to obtain a porous thermochromic PNIPAM hydrogel. The one or more sacrifice materials comprises one or more of $SiO_2$/Polystyrene (PS) spheres, emulsified oil droplets, and combinations thereof.

The method 900 may then proceed to illustrated process block 906, which includes forming an outer composite layer on the inner porous layer.

In accordance with the method 900, the outer composite layer comprises a first sublayer comprising the porous thermochromic PNIPAM hydrogel and a second sublayer composed of an optically absorptive material. The porous thermochromic PNIPAM hydrogel is configured to autonomously transition between a heating absorbing state and a heat dissipation state in response to a change in ambient temperature. The optically absorptive material is configured to absorb solar radiation. The optically absorptive material comprises a carbon-based material, such as, for example, graphite.

In accordance with the method 900, at a temperature less than the LCST of the thermally switchable sublayer, the porous thermochromic PNIPAM hydrogel absorbs water from the water reservoir. At a temperature greater than the LCST of the porous thermochromic PNIPAM hydrogel, the porous thermochromic PNIPAM hydrogel releases water to be absorbed by the water reservoir.

Figure 10:
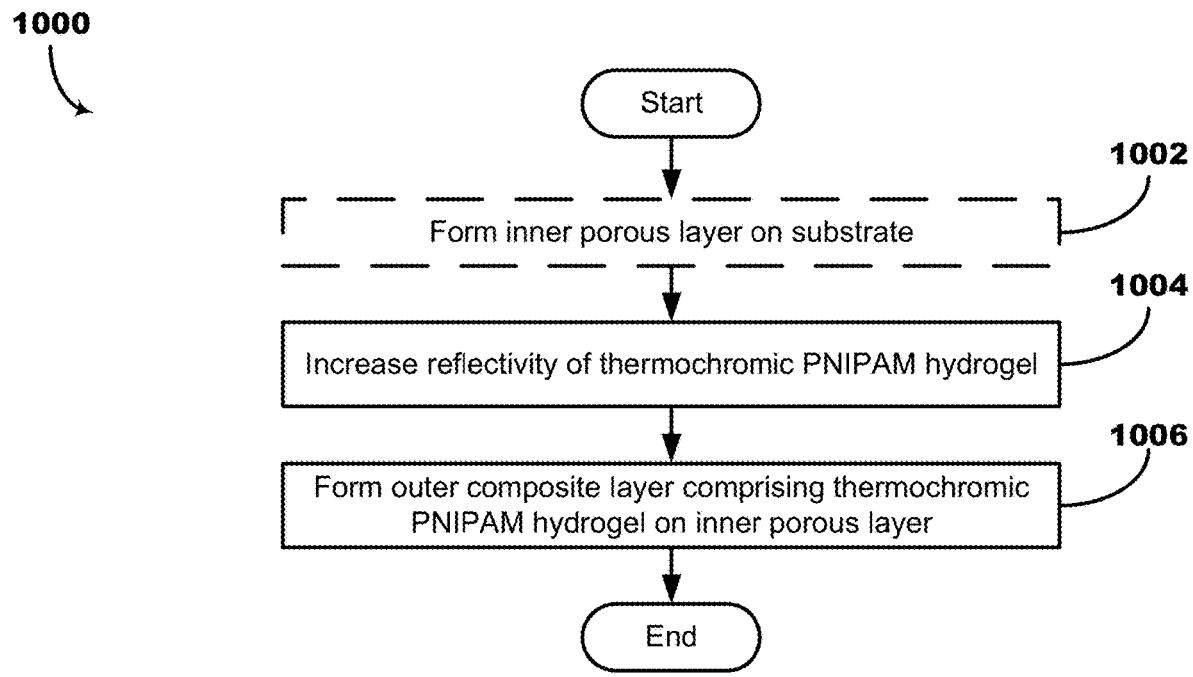

In the illustrated example of FIG. 10, the method 1000 includes illustrated block 1002, which includes forming (e.g., by deposition) an inner porous layer on a substrate. In accordance with the method 1000, the inner porous layer is configured to serve as a water reservoir.

The method 1000 may then proceed to illustrated process block 1004, which includes increasing the visible/near infrared reflectivity of the thermochromic PNIPAM hydrogel.

In accordance with the method 1000, increasing the visible/near infrared reflectivity of the thermochromic PNIPAM hydrogel comprises increasing the porosity of the thermochromic PNIPAM hydrogel. Increasing the porosity of the thermochromic PNIPAM hydrogel comprises: adding one or more sacrifice materials having a predetermined size (of approximately 1-5 um) to a precursor thermochromic PNIPAM hydrogel solution; polymerizing the precursor thermochromic PNIPAM hydrogel solution; and removing the one or more sacrifice materials from the polymerized precursor thermochromic PNIPAM hydrogel solution to obtain a porous thermochromic PNIPAM hydrogel. The one or more sacrifice materials comprises one or more of $SiO_2$/Polystyrene (PS) spheres, emulsified oil droplets, and combinations thereof.

The method 1000 may then proceed to illustrated process block 1006, which includes forming an outer composite layer on the inner porous layer.

In accordance with the method 1000, the outer composite layer comprises a first sublayer comprising the porous thermochromic PNIPAM hydrogel and a second sublayer composed of an optically absorptive material. The porous thermochromic PNIPAM hydrogel is configured to autonomously transition between a heating absorbing state and a heat dissipation state in response to a change in ambient temperature. The optically absorptive material is configured to absorb solar radiation. The optically absorptive material comprises a carbon-based material, such as, for example, graphite.

In accordance with the method 1000, at a temperature less than the LCST of the porous thermochromic PNIPAM hydrogel, the porous thermochromic PNIPAM hydrogel absorbs water from the water reservoir. At a temperature greater than the LCST of the porous thermochromic PNIPAM hydrogel, the porous thermochromic PNIPAM hydrogel releases water to be absorbed by the water reservoir.

The method 1000 may terminate or end after execution of process block 1006.

Figure 11:
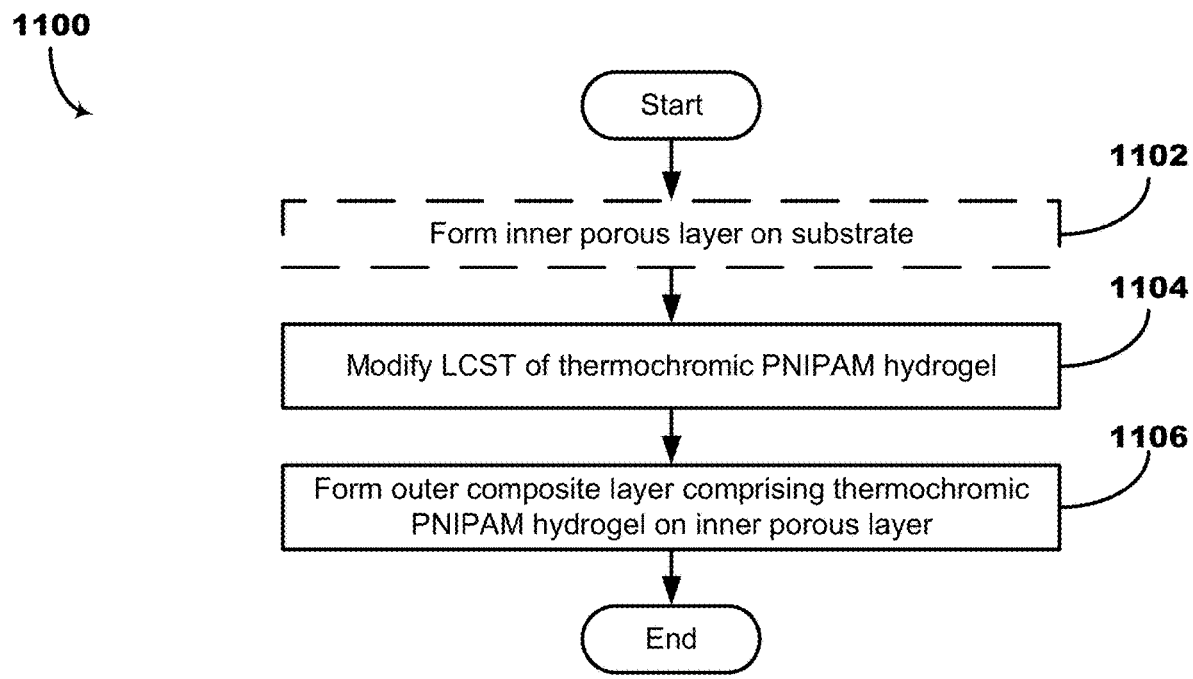

In the illustrated example of FIG. 11, the method 1100 includes illustrated block 1102, which includes forming (e.g., by deposition) an inner porous layer on a substrate. In accordance with the method 1100, the inner porous layer is configured to serve as a water reservoir.

The method 1100 may then proceed to illustrated process block 1104, which includes altering (e.g., reducing) the LCST of the thermochromic PNIPAM hydrogel.

In accordance with the method 1100, altering the LCST of the thermochromic PNIPAM hydrogel comprises: incubating the thermochromic PNIPAM hydrogel in a salted solution at a first predetermined temperature; heating the thermochromic PNIPAM hydrogel-salted solution to a second predetermined temperature that is greater than the first predetermined temperature, and maintaining the thermochromic PNIPAM hydrogel-salted solution at the second predetermined temperature for a first predetermined time period; cooling the thermochromic PNIPAM hydrogel-salted solution to the first predetermined temperature value, and maintaining the thermochromic PNIPAM hydrogel-salted solution at the first predetermined temperature for a second predetermined time period; repeating the heating/cooling cycle for three cycles; and removing the thermochromic PNIPAM hydrogel from the salted solution.

In accordance with the method 1100, the first predetermined temperature value is 25° C., the second predetermined temperature value is 50° C., the first predetermined time period is 30 minutes, and the second predetermined time period is 30 minutes.

The method 1100 may then proceed to illustrated process block 1106, which includes forming an outer composite layer on the inner porous layer.

In accordance with the method 1100, the outer composite layer comprises a first sublayer comprising the thermochromic PNIPAM hydrogel and a second sublayer composed of an optically absorptive material. The thermochromic PNIPAM hydrogel is configured to autonomously transition between a heating absorbing state and a heat dissipation state in response to a change in ambient temperature. The optically absorptive material is configured to absorb solar radiation. The optically absorptive material comprises a carbon-based material, such as, for example, graphite.

In accordance with the method 1100, at a temperature less than the altered LCST of the thermochromic PNIPAM hydrogel, the thermochromic PNIPAM hydrogel absorbs water from the water reservoir. At a temperature greater than the altered LCST of the thermochromic PNIPAM hydrogel, the thermochromic PNIPAM hydrogel releases water to be absorbed by the water reservoir.

The method 1100 may terminate or end after execution of process block 1106.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the one or more embodiments can be implemented in a variety of forms. Therefore, while the embodiments are set forth, illustrated, and/or described in connection with particular examples thereof, the true scope of the embodiments should not be so limited since other modifications will become apparent to the skilled practitioner upon a study of the drawings, specification, and claims.

What is claimed is:

1. A passive thermal management system, comprising:
a substrate; and
a thermally responsive multilayer structure on the substrate, the thermally responsive multilayer structure including:
an inner porous layer on the substrate, wherein the inner porous layer serves as a water reservoir, and
an outer composite layer on the inner porous layer, the outer composite layer being composed of a thermally switchable sublayer and an optically absorptive sublayer, the thermally switchable sublayer configured to autonomously transition between a heating absorbing state and a heat dissipation state in response to a change in ambient temperature, the optically absorptive sublayer configured to absorb solar radiation; and
one or more encapsulating layers on the multilayer structure, wherein the at least one encapsulating layer is composed of an optically transparent material;
wherein the thermally switchable sublayer comprises a thermally responsive polymer hydrogel, and wherein the optically absorptive sublayer comprises a carbon-based material;
wherein at a temperature less than a lower critical solution temperature of the thermally switchable sublayer, the thermally switchable sublayer absorbs water from the water reservoir, and
wherein at a temperature greater than the lower critical solution temperature of the thermally switchable sublayer, the thermally switchable sublayer releases water to be absorbed by the water reservoir.

2. The passive thermal management system of claim 1, wherein:

the thermally responsive polymer hydrogel comprises a thermochromic Poly(N-isopropylacrylamide (PNIPAM) hydrogel, and the carbon-based material comprises graphite.

3. A passive thermal management system, comprising:
a substrate; and
a thermally responsive multilayer structure on the substrate, the thermally responsive multilayer structure including:
- an inner porous layer on the substrate, wherein the inner porous layer serves as a water reservoir;
- an outer composite layer on the inner porous layer, the outer composite layer being composed of a thermally switchable sublayer and an optically absorptive sublayer; and
an encapsulating layer comprising an optically transparent material formed on the multilayer structure;
wherein the thermally switchable sublayer comprises means for autonomously transitioning between a heating absorbing state and a heat dissipation state in response to a change in ambient temperature;
wherein the optically absorptive sublayer comprises means for absorbing solar radiation;
wherein at a temperature less than a lower critical solution temperature of the thermally switchable sublayer, the thermally switchable sublayer absorbs water from the water reservoir, and
wherein at a temperature greater than the lower critical solution temperature of the thermally switchable sublayer, the thermally switchable sublayer releases water to be absorbed by the water reservoir.

* * * * *